(12) United States Patent
Cheng

(10) Patent No.: US 6,793,230 B1
(45) Date of Patent: Sep. 21, 2004

(54) SHOCK ABSORBING FRAME ASSEMBLY FOR A BICYCLE

(75) Inventor: Owen Cheng, Taichung Hsien (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 0 days.

(21) Appl. No.: 10/609,624

(22) Filed: Jul. 1, 2003

(51) Int. Cl.[7] .............................................. B60K 3/00
(52) U.S. Cl. ...................................... 280/284; 280/283
(58) Field of Search ................................. 280/284, 283, 280/285, 286, 288; 180/227

(56) References Cited

U.S. PATENT DOCUMENTS

| | | | | |
|---|---|---|---|---|
| 5,593,168 A | * | 1/1997 | Chou | 280/275 |
| 5,997,022 A | * | 12/1999 | Matsui | 280/284 |
| 6,149,175 A | * | 11/2000 | Fujii | 280/284 |
| 6,149,176 A | * | 11/2000 | Fujii | 280/284 |
| 6,253,868 B1 | * | 7/2001 | Horii et al. | 180/227 |
| 6,276,706 B1 | * | 8/2001 | Yih | 280/284 |
| 6,386,567 B1 | * | 5/2002 | Schonfeld | 280/283 |
| 6,648,356 B2 | * | 11/2003 | Osmecki | 280/284 |

\* cited by examiner

*Primary Examiner*—Lesley D. Morris
*Assistant Examiner*—Tony Winner
(74) *Attorney, Agent, or Firm*—Harness, Dickey & Pierce, P.L.C.

(57) ABSTRACT

A shock absorbing frame assembly for a bicycle includes a coupling mount and a linking unit respectively disposed on the front and rear frame units and respectively having first and second gripping members. The first gripping member has two first jaws walls spaced apart along a first line. The second gripping member has two second jaw walls spaced apart along a second line that is in the same plane with the first line in a normal position. A twistable member includes left and right gripped regions in frictional engagement with the first and second gripping members, and an intermediate segment which is twistable to permit the second gripping member to turn to a strained position when the rear frame unit moves angularly relative to the front frame unit in response to a shock, and to acquire a biasing force to urge the second gripping member to the normal position to thereby counteract the shock.

10 Claims, 4 Drawing Sheets

SHOCK ABSORBING FRAME ASSEMBLY FOR A BICYCLE

BACKGROUND OF THE INVENTION

1. Field of the Invention

This invention relates to a shock absorbing frame assembly for a bicycle, more particularly to a shock absorbing frame assembly which provides a shock absorbing effect by virtue of a twist of an elongated twistable member about a twisting axis.

2. Description of the Related Art

A conventional shock absorbing frame assembly for a bicycle generally includes a hydraulic (or pneumatic) cylinder (or piston) and a spring associated with the cylinder to absorb the shock generated as a result of running of a rear wheel of the bicycle on an uneven or bumpy road.

The shock absorbing effect that is provided by the conventional shock absorbing frame assembly is influenced by the length of a cylinder arm for travel of the cylinder. Specifically, a relatively long cylinder arm can provide a sufficient shock absorbing effect. However, the spring employed therein must possess a relatively large rigidity, which will undesirably reduce the shock absorbing effect. On the other hand, a relatively short cylinder arm results in a poor shock absorbing effect. Moreover, the arrangement of the cylinder and the spring on the bicycle mars the appearance of the bicycle as a whole.

SUMMARY OF THE INVENTION

The object of the present invention is to provide a shock absorbing frame assembly which is capable of providing an excellent shock absorbing effect, and which can enhance the aesthetic appeal of the frame assembly.

According to this invention, the shock absorbing frame assembly includes a front frame unit which has a head tube extending in an upright direction, a fork extending downwardly from the head tube, and adapted for mounting of a front wheel to permit rotation of the front wheel relative thereto about a front axis, and a down tube extending downwardly and rearwardly from the head tube and terminating at a bottom end. A seat mount is disposed opposite to the bottom end of the down tube in the upright direction. A rear frame unit includes a seat stay which has an upper coupling end coupled relative to the seat mount, and an intermediate segment extending from the upper coupling end rearwardly and downwardly and terminating at a rear mount end that is adapted for mounting of a rear wheel to permit rotation of the rear wheel relative thereto about a rear axis parallel to the front axis, and a chain stay which extends forwardly from the rear mount end and which terminates at a lower coupling end. A coupling mount is disposed on and extends downwardly from the down tube, and has a first gripping member which includes first front and rear jaw walls. The first front and rear jaw walls are spaced apart from each other along a first line which is radial to and which is equally divided by a first centerline that is parallel to the front axis. A linking unit includes an anchoring end secured to the lower coupling end, a middle arm extending forwardly from the anchoring end, and a second gripping member which extends forwardly from the middle arm and which is spaced apart from the first gripping member along the first centerline. The second gripping member has second front and rear jaw walls spaced apart from each other along a second line which is radial to and which is bisected by a second centerline that is parallel to the front axis. The first and second centerlines are aligned with each other on a twisting axis. When the chain stay moves angularly relative to the front frame unit due to shock generated as a result of running of the rear wheel on an uneven or bumpy road, the second gripping member is caused to turn from a normal position, where the first and second lines are in a same normal plane, to a strained position, where one of the first and second lines is out of the normal plane. An elongated twistable member extends along the twisting axis, and includes left and right gripped regions opposite to each other and in frictional engagement with the first and second gripping members, respectively, so as to prevent angular movements of the left and right gripped regions relative thereto, respectively, when the second gripping member is turned between the normal and strained positions, and an intermediate segment made of a material, which is twistable about the twisting axis to permit the second gripping member to turn to the strained position, so as to acquire a biasing force for urging the second gripping member to turn to the normal position, thereby counteracting the force of the shock. A bearing member is disposed to hold the intermediate segment on the twisting axis when the second gripping member is turned between the normal and strained positions.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
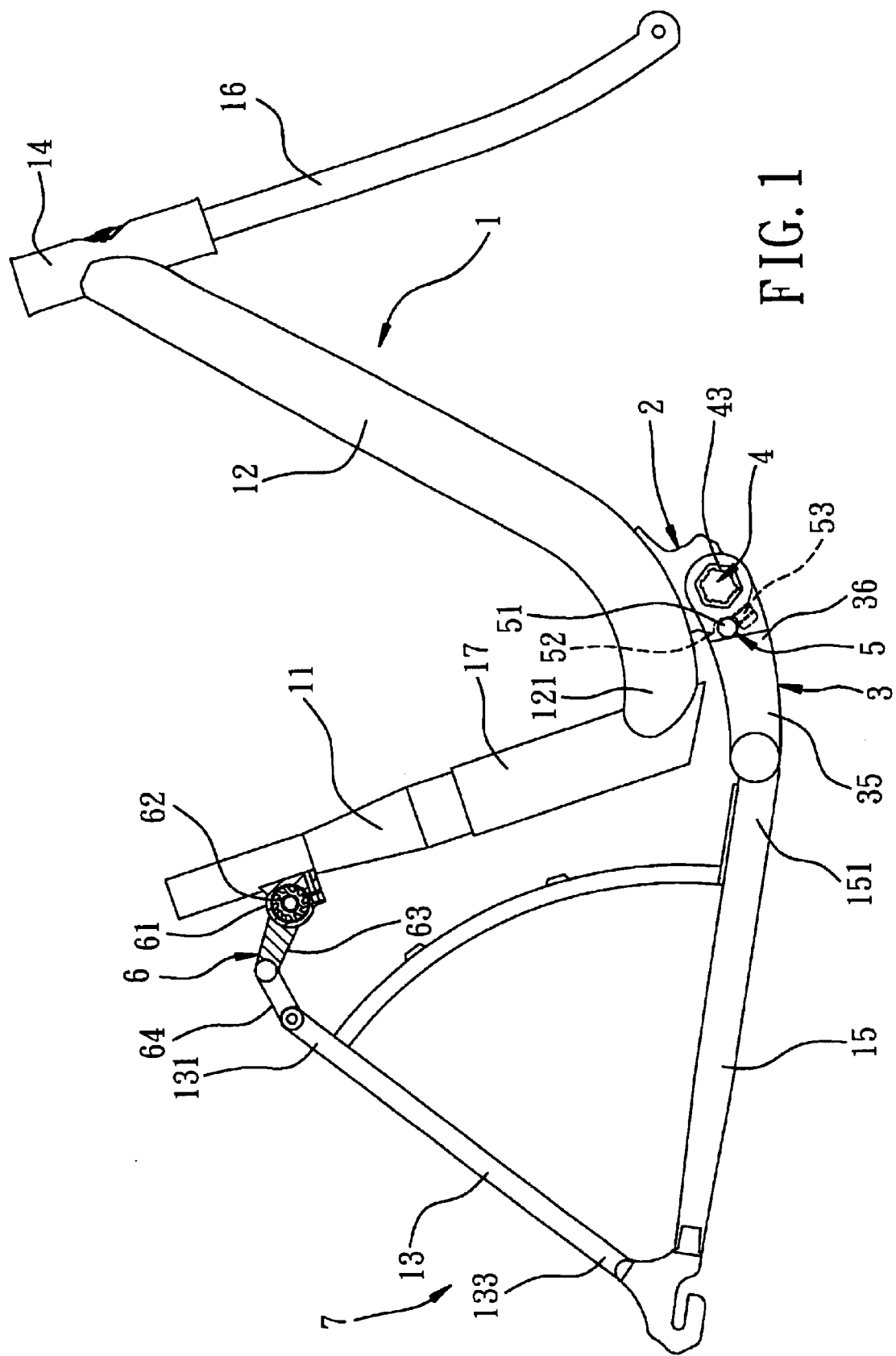
FIG. 1 is a partly sectional side view of the preferred embodiment of a shock absorbing frame assembly according to this invention.

Referring to FIG. 1, the preferred embodiment of a shock absorbing frame assembly for a bicycle according to the present invention is shown to comprise a front frame unit 1, a seat mount 11, a rear frame unit 7 opposite to the front frame unit 1 in a longitudinal direction, a coupling mount 2, a linking unit 3, an elongated twistable member 4, a bearing member, and a restoration assisting unit 6.

The front frame unit 1 includes a head tube 14 which extends in an upright direction, a fork 16 which extends downwardly from the head tube 14 and which is adapted for mounting of a front wheel (not shown) of the bicycle so as to permit rotation of the front wheel relative thereto about a front axis that is transverse to the upright and longitudinal directions, a down tube 12 which extends downwardly and rearwardly from the head tube 14 and which terminates at a bottom end 121, and a seat tube 17 which is connected to the bottom end 121 of the down tube 12.

The seat mount 11 is connected to and extends from the seat tube 17 in the upright direction.

The rear frame unit 7 includes a seat stay 13 and a chain stay 15. The seat stay 13 has an upper coupling end 131 which is coupled to the seat mount 11 by means of the restoration assisting unit 6, and an intermediate segment which extends from the upper coupling end 131 rearwardly and downwardly and which terminates at a rear mount end 133 that is adapted for mounting of a rear wheel (not shown) of the bicycle so as to permit rotation of the rear wheel relative thereto about a rear axis parallel to the front axis. The chain stay 15 extends forwardly from the rear mount end 133 and terminates at a lower coupling end 151.

Figure 2:
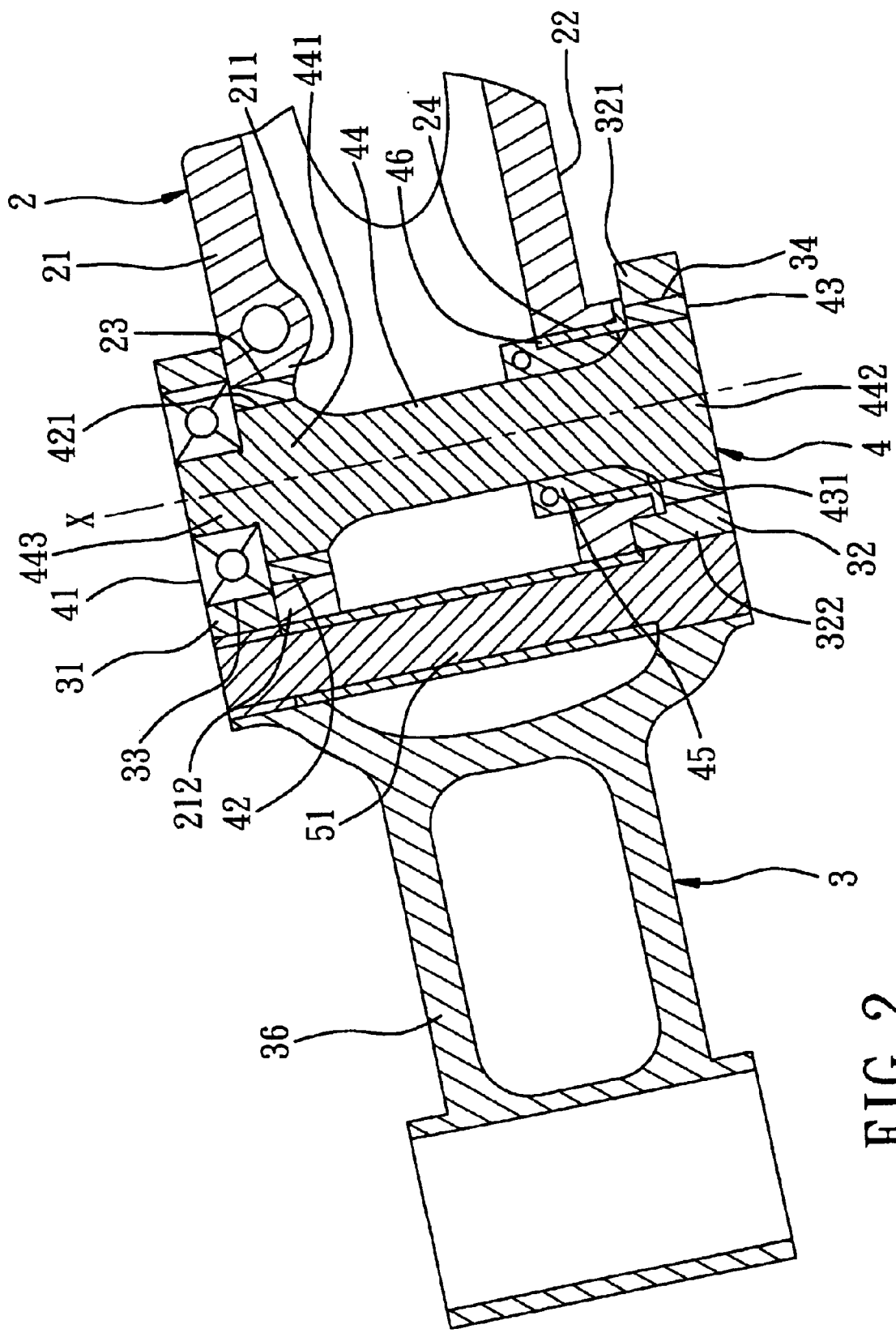
FIG. 2 is a fragmentary sectional view of a portion of the preferred embodiment.

With reference to FIGS. 1 and 2, the coupling mount 2 is disposed on and extends downwardly from the down tube 12, and has a first gripping member 21 which includes first front and rear jaw walls 211,212, and a first supporting member 22 which is disposed opposite to the first gripping member 21 in an axial direction radial to the front axis. The first front and rear jaw walls 211,212 are spaced apart from each other along a first line which is radial to and which is bisected by a first centerline that is parallel to the front axis. The first front and rear jaw walls 211,212 extend respectively and angularly about the first centerline. Two bridging walls interconnect the first front and rear jaw walls 211,212 so as to cooperatively confine a first clamping bore 23. In this embodiment, the first clamping bore 23 is substantially hexagonal. The first supporting member 22 has a through hole 24 extending along the first centerline.

The linking unit 3 includes an anchoring end 35 which is secured to the lower coupling end 151 of the chain stay 15, a middle arm 36 which extends forwardly from the anchoring end 35, and a second gripping member 32 which extends forwardly from the middle arm 36. The middle arm 36 has a second supporting member 31 which is disposed opposite to the second gripping member 32 in the axial direction.

The second gripping member 32 is spaced apart from the first gripping member 21 along the first centerline, and has second front and rear jaw walls 321,322 which are spaced apart from each other along a second line that is radial to and that is bisected by a second centerline parallel to the front axis. The second front and rear jaw walls 321,322 extend respectively and angularly about the second centerline. Two bridging walls interconnect the second front and rear jaw walls 321,322 so as to cooperatively confine a second clamping bore 34. In this embodiment, the second clamping bore 34 is substantially hexagonal. The second supporting member 31 has a through hole 33 extending along the second centerline. As such, the first and second centerlines are aligned with each other on a twisting axis (X).

When the chain stay 15 is caused to move angularly relative to the front frame unit 1 due to shock generated as a result of running of the front or rear wheel on an uneven or bumpy road, the second gripping member 32 will turn from a normal position, where the first and second lines are in a same normal plane, to a strained position, where one of the first and second lines is out of the normal plane.

Figure 3:
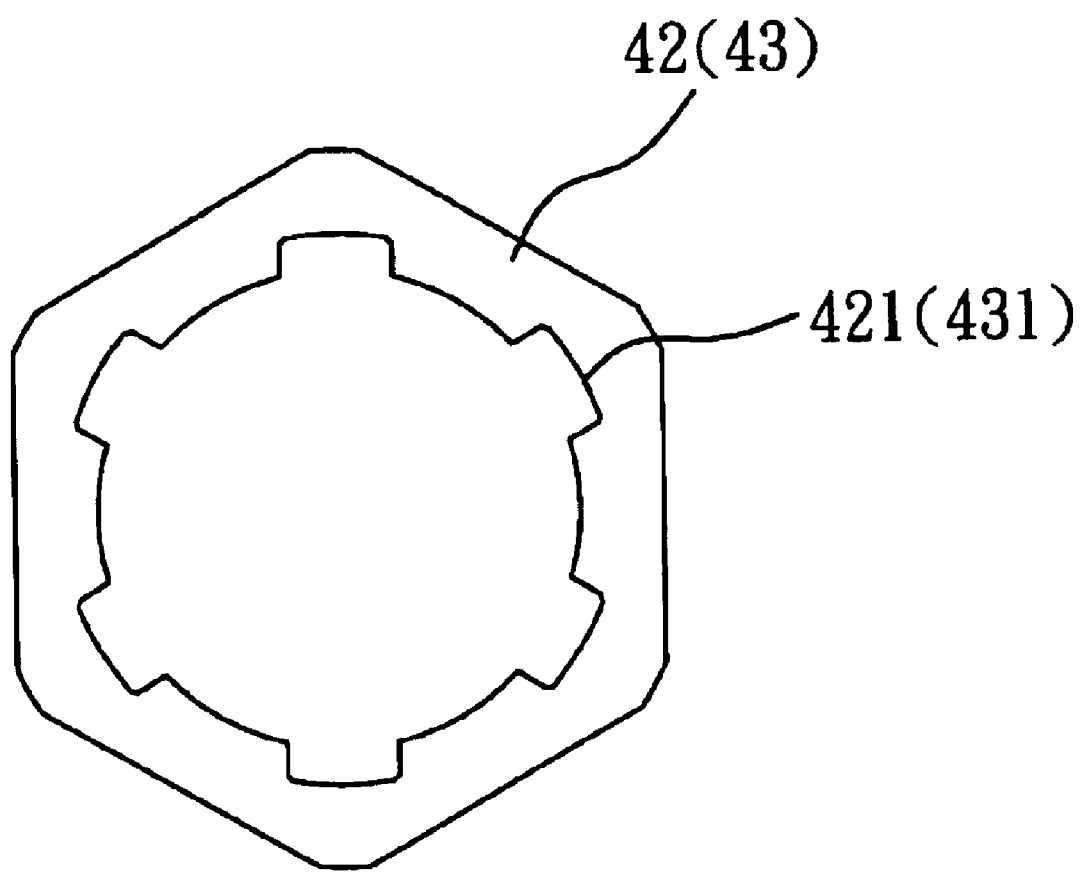
FIG. 3 is a schematic view of a bushing of the preferred embodiment.

The twistable member 4 extends along the twisting axis (X), and includes left and right gripped regions 441,442 opposite to each other. The left and right gripped regions 441,442 are respectively received in the first and second clamping bores 23,34 so as to be in frictional engagement with the first and second gripping members 21,32, respectively. The front and rear frame units 1,7 respectively include first and second bushings 42,43 which are respectively disposed between the left gripped region 441 and the first gripping member 21, and between the right gripped region 442 and the second gripping member 32. With reference to FIG. 3, each of the first and second bushings 42,43 has a plurality of angularly displaced recesses 421,431 so as to be in spline engagement with a corresponding one of the left and right gripped regions 441,442. Thus, the left and right gripped regions 441,442 are prevented from angular movements relative to the first and second gripping members 21,32, respectively, when the second gripping member 32 is turned between the normal and strained positions.

The twistable member 4 further includes an intermediate segment 44 which is made of a twistable material, such as titanium alloy, and which is twistable about the twisting axis (X) so as to permit the second gripping member 32 to turn to the strained position, and so as to acquire a first biasing force that will urge the second gripping member 32 to turn to the normal position, thereby counteracting the force of the shock. The twistable member 4 further includes a journalled end 443 which extends from the left gripped region 441 along the twisting axis (X) and outwardly of the first clamping bore 23 so as to be received in the through hole 33 in the second supporting member 31.

The bearing member includes a first bearing segment 45 which is a sleeve disposed in the through hole 24 in the first supporting member 22 and having an inner tubular wall that spacedly surrounds the intermediate segment 44 proximate to the second gripping member 32, and a third bushing 46 which is disposed between the inner tubular wall of the first bearing segment 45 and the intermediate segment 44, thereby ensuring that the intermediate segment 44 can be held on the twisting axis (X). The bearing member further includes a second bearing segment 41 which is disposed in the through hole 33 in the second supporting member 31 to journal the journalled end 443, thereby ensuring that the intermediate segment 44 can be held on the twisting axis (X).

Furthermore, as shown in FIGS. 1 and 2, a blocking member 5 includes a pin 51 and two pairs of barriers 52,53. The pin 51 is disposed between the second supporting member 31 and the second gripping member 32 so as to move angularly with the second gripping member 32, and extends in the axial direction, and is offset from the twisting axis (X). The barriers 52,53 are disposed on the first gripping member 21 and the first supporting member 22 such that, when the second gripping member 32 moves to the strained position, the pin 51 is prevented from moving angularly by the barriers 52,53. Thus, a limit of the extent of turning of the second gripping member 32 towards the strained position can be set.

Figure 4:
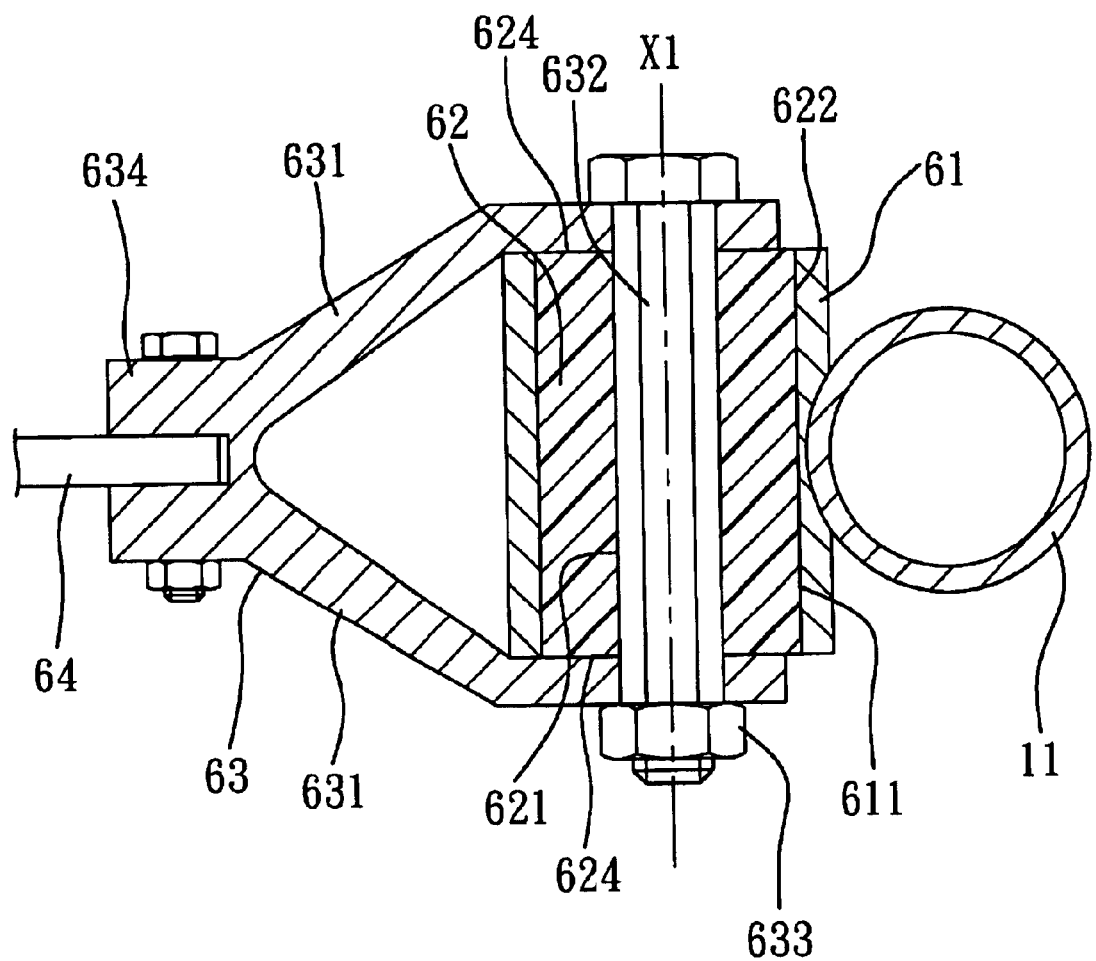
FIG. 4 is a fragmentary sectional view of another portion of the preferred embodiment.

Referring to FIGS. 1 and 4, the restoration assisting unit 6 includes a mounting sleeve 61, a tubular elastomeric member 62, a linking shaft 64, and a linking arm 63. The mounting sleeve 61 is secured to the seat mount 11, and has an inner sleeve wall 611. The elastomeric member 62 is received in the mounting sleeve 61, and has a plurality of tentacles 622 which are angularly displaced from one another about a rotating axis (X1) that is parallel to the rotating axis (X) and which drag along the inner sleeve wall 611 so as to be in a frictional engagement therewith. Thus, the elastomeric member 62 is prevented from rotation relative to the mounting sleeve 61 about a rotating axis (X1). The elastomeric member 62 further has right and left end walls 624 opposite to each other along the rotating axis (X1). The linking shaft 64 has a rear shaft end which is pivoted to the upper coupling end 131 of the seat stay 13, and a front shaft end which extends forwardly from the rear shaft end. The linking arm 63 has an anchoring end portion 634 which is anchored to the front shaft end of the linking shaft 64, and right and left abutment prongs 631 which extend from the anchoring end portion 634 to be in frictional engagement with the right and left end walls 624 of the elastomeric member 62, respectively, by means of a screw bolt 632 that passes through a hole 621 in the elastomeric member 62 and that engages threadedly two screw nuts 633. As such, when the second gripping member 32 is turned to the strained position, the linking arm 63 is rotated clockwise to drag the right and left abutment prongs 631 along the right and left end walls 624, respectively, thereby resulting in angular deformations of the right and left end walls 624 about the rotating axis (X1), which imparts the right and left end walls 624 with a second biasing force that urges the linking arm 63 to turn counterclockwise so as to assist in restoration of the second gripping member 32 to the normal position. Furthermore, the tentacles 622 are provided to facilitate angular deformation of the right and left end walls 624.

As illustrated, when the second gripping member 32 is caused to turn to the strained position due to angular movement of the chain stay 15 relative to the front frame unit 1 which is brought about by the shock, one of the left and right gripped regions 441,442 is caused to turn about the twisting axis (X) so as to twist the intermediate segment 44, whereby the shock is absorbed by the twistable member 4. At the same time, the linking arm 63 is rotated to drag the right and left abutment prongs 631 along the right and left end walls 624 so as to impart the right and left end walls 624 with the second biasing force, which cooperates with the first biasing force to urge the twistable member 4 to restore its original shape, and to urge the second gripping member 32 to the normal position. With such a construction, the prevent invention is able to provide an excellent shock absorbing effect. Besides, the problem associated with the length of the cylinder arm as in the prior art can be eliminated.

Furthermore, as the coupling mount 2 and the linking unit 3 are disposed at the joint between the front and rear frame units 1,7, and as the twistable member 4 and the bearing member are disposed in the coupling mount 2 and the linking unit 3, the coupling mount 2 and the linking unit 3 will be less obtrusive on the bicycle.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A shock absorbing frame assembly for a bicycle which has front and rear wheels opposite to each other and rotatable in a longitudinal direction, said shock absorbing frame assembly comprising:
   a front frame unit which includes
      a head tube extending in an upright direction,
      a fork extending downwardly from said head tube, and adapted for mounting of the front wheel to permit rotation of the front wheel relative thereto about a front axis which is transverse to the upright and longitudinal directions, and
      a down tube extending downwardly and rearwardly from said head tube and terminating at a bottom end;
   a seat mount disposed opposite to said bottom end of said down tube in the upright direction;
   a rear frame unit which includes
      a seat stay having an upper coupling end which is coupled relative to said seat mount, and an intermediate segment which extends from said upper coupling end rearwardly and downwardly and which terminates at a rear mount end that is adapted for mounting of the rear wheel to permit rotation of the rear wheel relative thereto about a rear axis parallel to the front axis, and
      a chain stay extending forwardly from said rear mount end and terminating at a lower coupling end;
   a coupling mount disposed on and extending downwardly from said down tube, and having a first gripping member which includes first front and rear jaw walls, said first front and rear jaw walls being spaced apart from each other along a first line which is radial to and which is bisected by a first centerline that is parallel to the front axis;
   a linking unit including an anchoring end secured to said lower coupling end, a middle arm extending forwardly from said anchoring end, and a second gripping member which extends forwardly from said middle arm and which is spaced apart from said first gripping member along the first centerline, said second gripping member having second front and rear jaw walls spaced apart from each other along a second line which is radial to and which is bisected by a second centerline that is parallel to the front axis, said second gripping member being disposed such that the first and second centerlines are aligned with each other on a twisting axis, and such that, when said chain stay is caused to move angularly relative to said front frame unit due to shock generated as a result of running of the rear wheel on an uneven or bumpy road, said second gripping member is caused to turn from a normal position, where the first and second lines are in a same normal plane, to a strained position, where one of the first and second lines is out of the normal plane;
   an elongated twistable member which extends along the twisting axis, and which includes left and right gripped regions opposite to each other and in frictional engagement with said first and second gripping members, respectively, so as to prevent angular movements of said left and right gripped regions relative thereto, respectively, when said second gripping member is turned between the normal and strained positions, and an intermediate segment made of a material, which is twistable about the twisting axis so as to permit said second gripping member to turn to the strained position, and so as to acquire a first biasing force for urging said second gripping member to turn to the normal position, thereby counteracting the shock; and
   a bearing member disposed to hold said intermediate segment on the twisting axis when said second gripping member is turned between the normal and strained positions.

2. The shock absorbing frame assembly according to claim 1, wherein said front frame unit includes a seat tube disposed to interconnect said seat mount and said bottom end of said down tube.

3. The shock absorbing frame assembly according to claim 2, wherein said first front and rear jaw walls extend respectively and angularly about the first centerline to cooperatively confine a first clamping bore for receiving said left gripped region, said second front and rear jaw walls extending respectively and angularly about the second centerline to cooperatively confine a second clamping bore for receiving said right gripped region.

4. The shock absorbing frame assembly according to claim 3, wherein said front and rear frame units respectively include first and second bushings respectively disposed between said left gripped region and said first gripping member, and between said right gripped region and said second gripping member.

5. The shock absorbing frame assembly according to claim 4, wherein said bearing member includes a first bearing segment which is disposed on said coupling mount, which is spaced apart from said first gripping member in an axial direction parallel to the front axis, and which has an inner tubular wall disposed to spacedly surround said intermediate segment proximate to said second gripping member, and a third bushing which is disposed between said inner tubular wall and said intermediate segment, thereby maintaining said intermediate segment on the twisting axis.

6. The shock absorbing frame assembly according to claim 5, wherein said elongated twistable member includes a journalled end extending from said left gripped region along the twisting axis and outwardly of said first clamping bore, said bearing member further including a second bearing segment disposed on said middle arm and extending leftwards of said first gripping member to journal said journalled end, thereby maintaining said intermediate segment on the twisting axis.

7. The shock absorbing frame assembly according to claim 6, further comprising a blocking member disposed to limit an extent of turning of said second gripping member towards the strained position.

8. The shock absorbing frame assembly according to claim 7, wherein said blocking member includes a pin which is disposed between said middle arm and said second gripping member so as to move angularly with said second gripping member, and which extends in the axial direction, and which is offset from the twisting axis, and a barrier disposed on said first gripping member and configured such that, when said second gripping member moves to the strained position, said pin is prevented from moving angularly by said barrier.

9. The shock absorbing frame assembly according to claim 2, further comprising a restoration assisting unit that includes a mounting sleeve which is secured to said seat mount and which has an inner sleeve wall, an elastomeric member which is received in said mounting sleeve, which is in frictional engagement with said inner sleeve wall so as to be prevented from rotating relative to said mounting sleeve about a rotating axis that is parallel to the twisting axis, and which has right and left end walls opposite to each other along the rotating axis, a linking shaft which has a rear shaft end pivoted to said upper coupling end of said seat stay, and a front shaft end extending forwardly from said rear shaft end, and a linking arm which has an anchoring end portion anchored to said front shaft end, and right and left abutment prongs extending from said anchoring end portion to be in frictional engagement with said right and left end walls of said elastomeric member, respectively, such that, when said second gripping member is turned to the strained position, said linking arm is rotated clockwise to drag said right and left abutment prongs along said right and left end walls, respectively, thereby resulting in angular deformations of said right and left end walls about the rotating axis, which imparts said right and left end walls with a second biasing force that urges said linking arm to turn counterclockwise so as to assist in restoration of said second gripping member to the normal position.

10. The shock absorbing frame assembly according to claim 9, wherein said elastomeric member has a plurality of tentacles angularly displaced from one another about the rotating axis, and disposed to drag along said inner sleeve wall, thereby facilitating angular deformation of said right and left end walls.

* * * * *